(12) United States Patent
Hayashi et al.

(10) Patent No.: US 12,483,144 B2
(45) Date of Patent: Nov. 25, 2025

(54) POWER CONVERSION DEVICE

(71) Applicant: KABUSHIKI KAISHA TOSHIBA, Tokyo (JP)

(72) Inventors: Yusuke Hayashi, Yokohama Kanagawa (JP); Keigo Arita, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 142 days.

(21) Appl. No.: 18/452,642

(22) Filed: Aug. 21, 2023

(65) Prior Publication Data

US 2024/0297589 A1 Sep. 5, 2024

(30) Foreign Application Priority Data

Mar. 2, 2023 (JP) .................... 2023-032026

(51) Int. Cl.
*H02M 3/335* (2006.01)
*H02M 1/00* (2007.01)
*H02M 3/00* (2006.01)

(52) U.S. Cl.
CPC ....... *H02M 3/3353* (2013.01); *H02M 1/0064* (2021.05); *H02M 1/0074* (2021.05);
(Continued)

(58) Field of Classification Search
CPC ............ H02M 1/0064; H02M 1/0074; H02M 1/0077; H02M 3/01; H02M 3/3353; H02M 3/33573
See application file for complete search history.

(56) References Cited

U.S. PATENT DOCUMENTS 11,095,128 B2  8/2021  Miyazaki et al.
11,133,739 B2  9/2021  Slepchenkov et al.
(Continued)

FOREIGN PATENT DOCUMENTS

JP   2010-104077 A   5/2010
JP   2020-524473 A   8/2020
(Continued)

OTHER PUBLICATIONS

Mutsumi Watase et al., "Proposal of a Highly Reliable Operating Method of a Voltage Controlled and Current Controlled Converter," 2006 IEEJ Industrial Application Society Conf., pp. I-381 to I-384 (2006).
(Continued)

*Primary Examiner* — Jue Zhang
(74) *Attorney, Agent, or Firm* — Finnegan, Henderson, Farabow, Garrett & Dunner, LLP

(57) ABSTRACT

According to one embodiment, a power conversion device includes: a plurality of DC-DC converter circuits configured to generate AC voltages at both ends of a plurality of first inductors by switching on a DC voltage and rectifies the AC voltages to output DC voltages; and a plurality of second inductors respectively magnetically coupled to the plurality of first inductors of the plurality of DC-DC converter circuits, wherein inputs and outputs of the plurality of DC-DC converter circuits are respectively connected in series and the plurality of second inductors are connected in parallel between two nodes.

10 Claims, 5 Drawing Sheets

(52) U.S. Cl.
CPC ........... *H02M 1/0077* (2021.05); *H02M 3/01* (2021.05); *H02M 3/33573* (2021.05)

(56) References Cited

U.S. PATENT DOCUMENTS

| | | | |
|---|---|---|---|
| 11,303,214 B2 | 4/2022 | Hayashi et al. | |
| 2017/0025963 A1* | 1/2017 | Otake | H02M 3/33571 |
| 2023/0402934 A1* | 12/2023 | Hu | H02M 3/33573 |

FOREIGN PATENT DOCUMENTS

| | | |
|---|---|---|
| JP | 2021-132468 A | 9/2021 |
| JP | 2023-77976 A | 6/2023 |
| WO | WO 2016/158031 A1 | 10/2016 |
| WO | WO 2018/232403 A1 | 12/2018 |

OTHER PUBLICATIONS

Hongliang Wang et al., "Automatic Current-Sharing Method for Multi-Phase LLC Resonant Converter," 2016 IEEE 8th Int'l Power Elecs. and Motion Control Conf. (IPEMC-ECCE Asia), pp. 3198-3205 (2016).

\* cited by examiner

POWER CONVERSION DEVICE

CROSS REFERENCE TO RELATED APPLICATIONS

This application is based upon and claims the benefit of priority from the prior Japanese Patent Application No. 2023-032026, filed on Mar. 2, 2023, the entire contents of which are incorporated herein by reference.

FIELD

Embodiments described herein relate to a power conversion device.

BACKGROUND

There has been known a power conversion device that steps up or steps down a DC input voltage and outputs the DC input voltage as a constant DC voltage. As a configuration of the power conversion device, there has been known, for example, a configuration that realizes a high transformation ratio by connecting, in series, inputs and outputs of a plurality of DC-DC converter circuits. In this case, input voltages and output voltages to and from the plurality of DC-DC converter circuits are preferably respectively equalized.

However, actually, it is difficult to cause circuit parameters of the plurality of DC-DC converter circuits to completely coincide. As a result, it is also difficult to respectively completely equalize the input voltages and the output voltages of the plurality of DC-DC converter circuits. In order to cope with this problem, for example, it is conceivable to add a compensation circuit, a software control system, or the like for equalizing voltages.

However, as a configuration of the compensation circuit, for example, a step-up/step-down chopper circuit and a flyback converter circuit are conceivable. However, configurations of these circuits are relatively complicated and the entire circuit is increased in size. When the software control system is provided, design is complicated and, as the number of DC-DC converter circuits increases, an operation becomes unstable.

DETAILED DESCRIPTION

Figure 1:
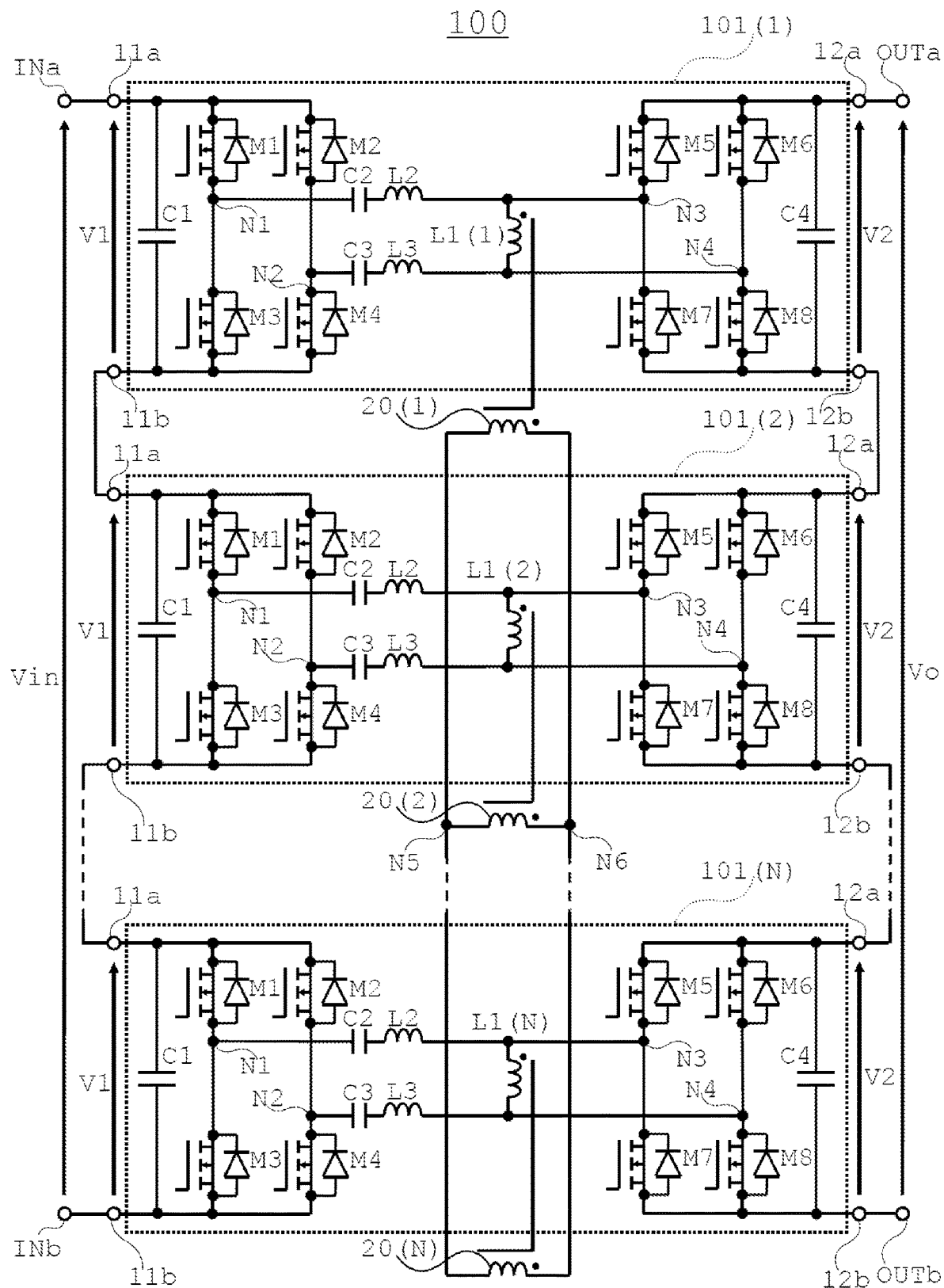
FIG. 1 is a diagram illustrating a configuration of a power conversion device according to a first embodiment.

According to one embodiment, a power conversion device includes: a plurality of DC-DC converter circuits configured to generate AC voltages at both ends of a plurality of first inductors by switching on a DC voltage and rectifies the AC voltages to output DC voltages; and a plurality of second inductors respectively magnetically coupled to the plurality of first inductors of the plurality of DC-DC converter circuits, wherein inputs and outputs of the plurality of DC-DC converter circuits are respectively connected in series and the plurality of second inductors are connected in parallel between two nodes.

According to one embodiment, a power conversion device includes: a plurality of DC-DC converter circuits configured to generate AC voltages at both ends of a plurality of first inductors by switching on a DC voltage and rectifies the AC voltages to output DC voltages; and a plurality of third inductors respectively connected in parallel to the plurality of first inductors of the plurality of DC-DC converter circuits, wherein inputs and outputs of the plurality of DC-DC converter circuits are respectively connected in series and the plurality of third inductors are magnetically connected in parallel.

Embodiments are explained below with reference to the drawings. The same or corresponding elements are denoted by the same reference numerals and signs in the drawings and repetition of the detailed explanation of the elements is omitted as appropriate.

First Embodiment

FIG. 1 is a diagram illustrating a configuration of a power conversion device 100 according to a first embodiment. The power conversion device 100 is a device that steps up or steps down a DC input voltage and outputs the DC input voltage as a constant DC voltage. The power conversion device 100 includes input terminals INa and INb and output terminals OUTa and OUTb. A DC input voltage Vin is applied to the input terminals INa and INb. A DC output voltage Vo is output from the output terminals OUTa and OUTb.

The power conversion device 100 includes N DC-DC converter circuits 101(1) to 101(N). Input terminals 11a and 11b and output terminals 12a and 12b of the DC-DC converter circuits 101(1) to 101(N) are respectively connected in series.

The input terminal 11a of the DC-DC converter circuit 101(1) at the top stage is connected to the input terminal INa of the power conversion device 100. The input terminal 11b of the DC-DC converter circuit 101(N) at the bottom stage is connected to the input terminal INb of the power conversion device 100. All of input voltages V1 to the DC-DC converter circuits 101(1) to 101(N) are ideally equal. Therefore, V1×N=Vin.

The output terminal 12a of the DC-DC converter circuit 101(1) at the top stage is connected to the output terminal OUTa of the power conversion device 100. The output terminal 12b of the DC-DC converter circuit 101(N) at the bottom stage is connected to the output terminal OUTb of the power conversion device 100. All of output voltages V2 from the DC-DC converter circuits 101(1) to 101(N) are ideally equal. Therefore, V2×N=Vo.

Subsequently, a detailed configuration of the DC-DC converter circuits 101(1) to 101(N) is explained. However, since all of configurations of the DC-DC converter circuits 101(1) to 101(N) are the same, the DC-DC converter circuits 101(1) to 101(N) are collectively described as DC-DC converter circuit 101.

The DC-DC converter circuit 101 is a well-known LLC-type converter circuit. The DC-DC converter circuit 101 switches a DC voltage V1 input from the input terminals 11a and 11b, generates AC voltages at both ends of a first inductor L1, rectifies the AC voltages, and outputs a DC voltage V2 from the output terminals 12a and 12b.

A capacitor C1 that smooths the input voltages V1 and a full-bridge type inverter circuit configured by semiconductor switching elements M1 to M4 are provided on an input side of the DC-DC converter circuit 101. As the semiconductor switching elements M1 to M4, for example, N-channel type MOSFETs (Metal Oxide Semiconductor Field Effect Transistors) can be used. In this case, drain terminals of the semiconductor switching elements M1 and M2 are connected to the input terminal 11a and source terminals of the semiconductor switching elements M3 and M4 are connected to the input terminal 11b. A source terminal of the semiconductor switching element M1 and a drain terminal of the semiconductor switching element M3 are connected. A source terminal of the semiconductor switching element M2 and a drain terminal of the semiconductor switching element M4 are connected.

A capacitor C2, an inductor L2, the first inductor L1, an inductor L3, and a capacitor C3 are connected in series between a first node N1 that connects the semiconductor switching element M1 and the semiconductor switching element M3 and a second node N2 that connects the semiconductor switching element M2 and the semiconductor switching element M4. A control signal is input to gate terminals of the semiconductor switching elements M1 to M4 from a not-illustrated control circuit. The semiconductor switching elements M1 to M4 perform a switching operation according to the control signal, whereby AC voltages are generated at both ends of the first inductor L1.

A full-bridge type rectifier circuit configured by semiconductor switching elements M5 to M8 and a capacitor C4 that smooths the output voltages V2 are provided on an output side of the DC-DC converter circuit 101. As the semiconductor switching elements M5 to M8, for example, N-channel type MOSFETs can be used. In this case, drain terminals of the semiconductor switching elements M5 and M6 are connected to the output terminal 12a and source terminals of the semiconductor switching elements M7 and M8 are connected to the output terminal 12b. A source terminal of the semiconductor switching element M5 and a drain terminal of the semiconductor switching element M7 are connected and a source terminal of the semiconductor switching element M6 and a drain terminal of the semiconductor switching element M8 are connected.

One end of the first inductor L1 is connected to a third node N3 that connects the semiconductor switching element M5 and the semiconductor switching element M7. The other end of the first inductor L1 is connected to a fourth node N4 that connects the semiconductor switching element M6 and the semiconductor switching element M8. A control signal is input to gate terminals of the semiconductor elements M5 to M8 from the not-illustrated control circuit. The semiconductor switching elements M5 to M8 perform a switching operation according to the control signal, whereby AC voltages generated at both the ends of the first inductor L1 are rectified and converted into DC voltages.

The power conversion device 100 includes N second inductors 20(1) to 20(N) respectively magnetically coupled to first inductors L1(1) to L1(N) of the N DC-DC converter circuits 101(1) to 101(N). The second inductors 20(1) to 20(N) are connected in parallel between a node N5 and a node N6. All of coupling ratios of the first inductors L1(1) to L1(N) and the second inductors 20(1) to 20(N) are equal and are, for example, 1:1.

A transformer is configured by the first inductor L1(1) of the DC-DC converter circuit 101(1) and the second inductor 20(1) magnetically coupled to the first inductor L1(1).

Similarly, a transformer is configured by the first inductor L1(2) of the DC-DC converter circuit 101(2) and the second inductor 20(2) magnetically coupled to the first inductor L1(2).

Similarly, a transformer is configured by the first inductor L1(N) of the DC-DC converter circuit 101(N) and the second inductor 20(N) magnetically coupled to the first inductor L1(N).

Polarities of the transformers are set to equalize all of phases of AC voltages generated at both ends of the second inductors 20(1) to 20(N). Specifically, in the first embodiment, all of timings of switching control by the semiconductor switching elements M1 to M4 of the DC-DC converter circuits 101(1) to 101(N) are equal. Therefore, all of phases of AC voltages generated at both ends of the first inductors L1(1) to L1(N) are equal.

In this case, in order to equalize all of the phases of the AC voltages generated at both the ends of the second inductors 20(1) to 20(N), it is necessary to set all of the polarities of the transformers the same. In an example illustrated in FIG. 1, all of the polarities of the transformers are set to be the same polarity. Alternatively, all of the polarities of the transformers may be set to be reverse polarities.

As explained above, when the power conversion device 100 is actually mounted, it is difficult to cause circuit parameters of the DC-DC converter circuits 101(1) to 101(N) to completely coincide. Therefore, if the second inductors 20(1) to 20(N) are absent, it is difficult to completely equalize the input voltages V1 and the output voltages V2 to and from the DC-DC converter circuits 101(1) to 101(N).

In order to cope with this problem, in the first embodiment, the second inductors 20(1) to 20(N) respectively magnetically coupled to the first inductors L1(1) to L1(N) at equal coupling ratios are provided. The second inductors 20(1) to 20(N) are connected in parallel between the node N5 and the node N6. In a plurality of transformers configured by the first inductors L1(1) to L1(N) and the second inductors 20(1) to 20(N), polarities based on the nodes N3, N4, N5, and N6 are the same.

In other words, polarities of the plurality of transformers configured by the first inductors L1(1) to L1(N) and the second inductors 20(1) to 20(N) are set in a direction in which, when an electric current flowing from one node N3 to the other node N4 of certain one first inductor L1 increases, an electric current flowing from the nodes N4 to the nodes N3 of the other plurality of first inductors L1 increases.

For example, when a relatively large voltage is applied between the node N3 and the node N4 of certain one DC-DC converter circuit 101, a relatively large current flows from the node N3 to the node N4. At this time, an electromotive force, which is positive on the side of the node N5, is generated via the transformer between the node N5 and the node N6 of the second inductor 20 corresponding to the node N3 and the node N4. A secondary electromotive force, which is positive on the side of the nodes N4, is generated via the transformers between the nodes N3 and the nodes N4 of the other plurality of DC-DC converter circuits 101.

Consequently, all of both end voltages of the first inductors L1(1) to L1(N) connected between the node N3 and the node N4 are balanced to be equal. The input voltages V1 to the DC-DC converter circuits 101(1) to 101(N) are equalized at high accuracy. The output voltages V2 from the DC-DC converter circuits 101(1) to 101(N) obtained by rectifying the both end voltages of the first inductors L1(1) to L1(N) are also equalized at high accuracy.

As explained above, the power conversion device 100 according to the first embodiment includes the second inductors 20(1) to 20(N) respectively magnetically coupled to the first inductors L1(1) to L1(N) of the DC-DC converter circuits 101(1) to 101(N). The second inductors 20(1) to 20(N) are connected in parallel between the node N5 and the node N6.

With the characteristics explained above, in the power conversion device 100 according to the first embodiment, it is possible to respectively equalize input voltages and output voltages to and from the plurality of DC-DC converter circuits with an extremely simple circuit configuration without providing a complicated compensation circuit, a software control system, and the like for respectively equalizing the input voltages and the output voltages to and from the plurality of DC-DC converters as in the related art.

As a result, it is possible to further reduce the entire circuit in size than the related art, design of the software control system is unnecessary, and it is possible to reduce a development period. Since it is unnecessary to consider instability during an operation of the plurality of DC-DC converter circuits in the design of the software control system, it is possible to connect a larger number of DC-DC converter circuits in series.

Note that, for each of the DC-DC converter circuits 101(1) to 101(N), the transformer configured by the first inductor L1 and the second inductor 20 may be provided in a housing of the DC-DC converter circuit 101 or may be provided outside the housing. When the transformer is provided in the housing of the DC-DC converter circuit 101, it is easy to connect the plurality of DC-DC converter circuits and extensibility is improved. On the other hand, when the transformer is provided outside the housing of the DC-DC converter circuit 101, the second inductor 20 only has to be added to the existing DC-DC converter circuit. Therefore, it is easy to manufacture the power conversion device 100.

Second Embodiment

Figure 2:
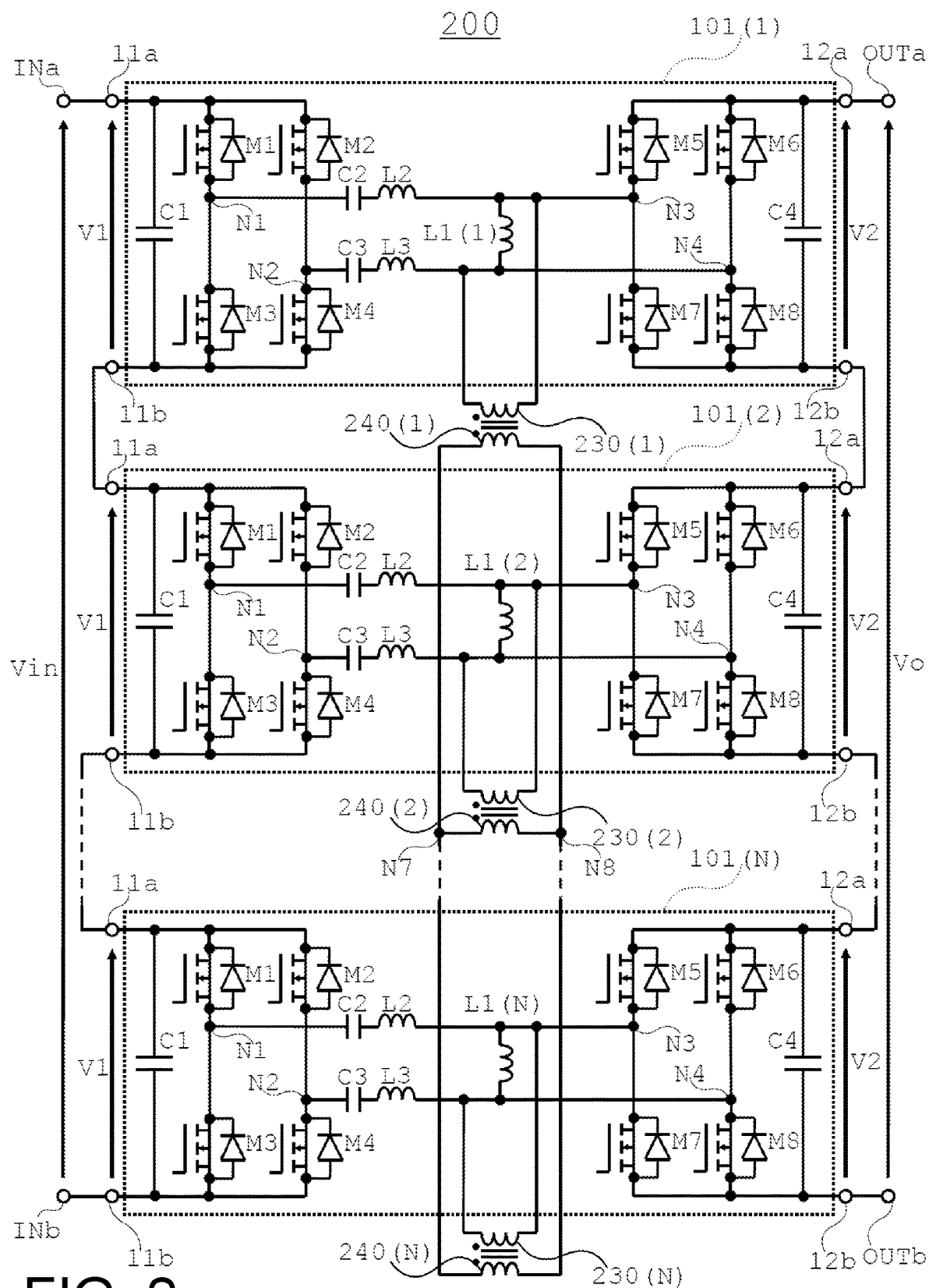
FIG. 2 is a diagram illustrating a configuration of a power conversion device according to a second embodiment.

FIG. 2 is a diagram illustrating a configuration of a power conversion device 200 according to a second embodiment. The power conversion device 200 includes third inductors 230(1) to 230(N) and fourth inductors 240(1) to 240(N) instead of the second inductors 20(1) to 20(N) of the power conversion device 100 according to the first embodiment explained above.

The third inductors 230(1) to 230(N) are respectively connected in parallel to the first inductors L1(1) to L1(N). The third inductors 230(1) to 230(N) and the fourth inductors 240(1) to 240(N) are magnetically coupled at equal coupling ratios, for example, 1:1. The fourth inductors 240(1) to 240(N) are connected in parallel between a node N7 and a node N8.

A transformer is configured by the third inductor 230(1) connected in parallel to the first inductor L1(1) of the DC-DC converter circuit 101(1) and the fourth inductor 240(1) magnetically coupled to the third inductor 230(1).

Similarly, a transformer is configured by the third inductor 230(2) connected in parallel to the first inductor L1(2) of the DC-DC converter circuit 101(2) and the fourth inductor 240(2) magnetically coupled to the third inductor 230(2).

Similarly, a transformer is configured by the third inductor 230(N) connected in parallel to the first inductor L1(N) of the DC-DC converter circuit 101(N) and the fourth inductor 240(N) magnetically coupled to the third inductor 230(N).

Polarities of the transformers are set to equalize all of phases of AC voltages generated at both ends of the fourth inductors 240(1) to 240(N). Specifically, in the second embodiment, all of timings of switching control by the semiconductor switching elements M1 to M4 of the DC-DC converter circuits 101(1) to 101(N) are equal. Therefore, all of phases of AC voltages generated at both ends of the third inductors 230(1) to 230(N) are equal.

In this case, in order to equalize all of the phases of the AC voltages generated at both the ends of the fourth inductors 240(1) to 240(N), it is necessary to set all of polarities of the transformers the same. In an example illustrated in FIG. 2, all of the polarities of the transformers are set to be the same polarity. Alternatively, all of the polarities of the transformers may be set to be reverse polarities.

In the second embodiment, in a plurality of transformers configured by the third inductors 230(1) to 230(N) and the fourth inductors 240(1) to 240(N), polarities based on the nodes N3, N4, N7, and N8 are the same.

In other words, polarities of the plurality of transformers configured by the third inductors 230(1) to 230(N) and the fourth inductors 240(1) to 240(N) are set in a direction in which, when an electric current flowing from one node N3 to the other node N4 of certain one third inductor 230 increases, an electric current flowing from the nodes N4 to the nodes N3 of the other plurality of third inductors 230 increases.

For example, when a relatively large voltage is applied between the node N3 and the node N4 of certain one DC-DC converter circuit 101, a relatively large current flows from the node N3 to the node N4. At this time, an electromotive force, which is positive on the side of the node 7, is generated via the transformer between the node N7 and the node N8 of the fourth inductor 240 corresponding to the node N3 and the node N4. A secondary electromotive force, which is positive on the side of the nodes N4, is generated via the transformers between the nodes N3 and the nodes N4 of the other plurality of DC-DC converter circuits 101.

Consequently, all of both end voltages of the third inductors 230(1) to 230(N) connected between the node N3 and the node N4 are balanced to be equal. All of both end voltages of the first inductors L1(1) to L1(N) connected in parallel to the third inductors 230(1) to 230(N) are also equal. As a result, the input voltages V1 to the DC-DC converter circuits 101(1) to 101(N) are equalized at high accuracy. The output voltages V2 from the DC-DC converter circuits 101(1) to 101(N) obtained by rectifying the both end voltages of the first inductors L1(1) to L1(N) are also equalized at high accuracy.

As explained above, the power conversion device 200 according to the second embodiment includes the third inductors 230(1) to 230(N) respectively connected in parallel to the first inductors L1(1) to L1(N) of the DC-DC converter circuits 101(1) to 101(N) and the fourth inductors 240(1) to 240(N) respectively magnetically coupled to the third inductors 230(1) to 230(N). The fourth inductors 240(1) to 240(N) are connected in parallel between the node N7 and the node N8.

With the characteristics explained above, the power conversion device 200 according to the second embodiment can obtain the same effects as the effects in the first embodiment explained above. For each of the DC-DC converter circuits 101(1) to 101(N), the transformer configured by the third inductor 230 and the fourth inductor 240 may be provided in the housing of the DC-DC converter circuit 101 or may be provided outside the housing. When the transformer is provided in the housing of the DC-DC converter circuit 101, it is easy to connect the plurality of DC-DC converter circuits and extensibility is improved. On the other hand, when the transformer is provided outside the housing of the DC-DC converter circuit 101, the third inductor 230 and the fourth inductor 240 only have to be added to the existing DC-DC converter circuit. Therefore, it is easy to manufacture the power conversion device 200.

Third Embodiment

Figure 3:
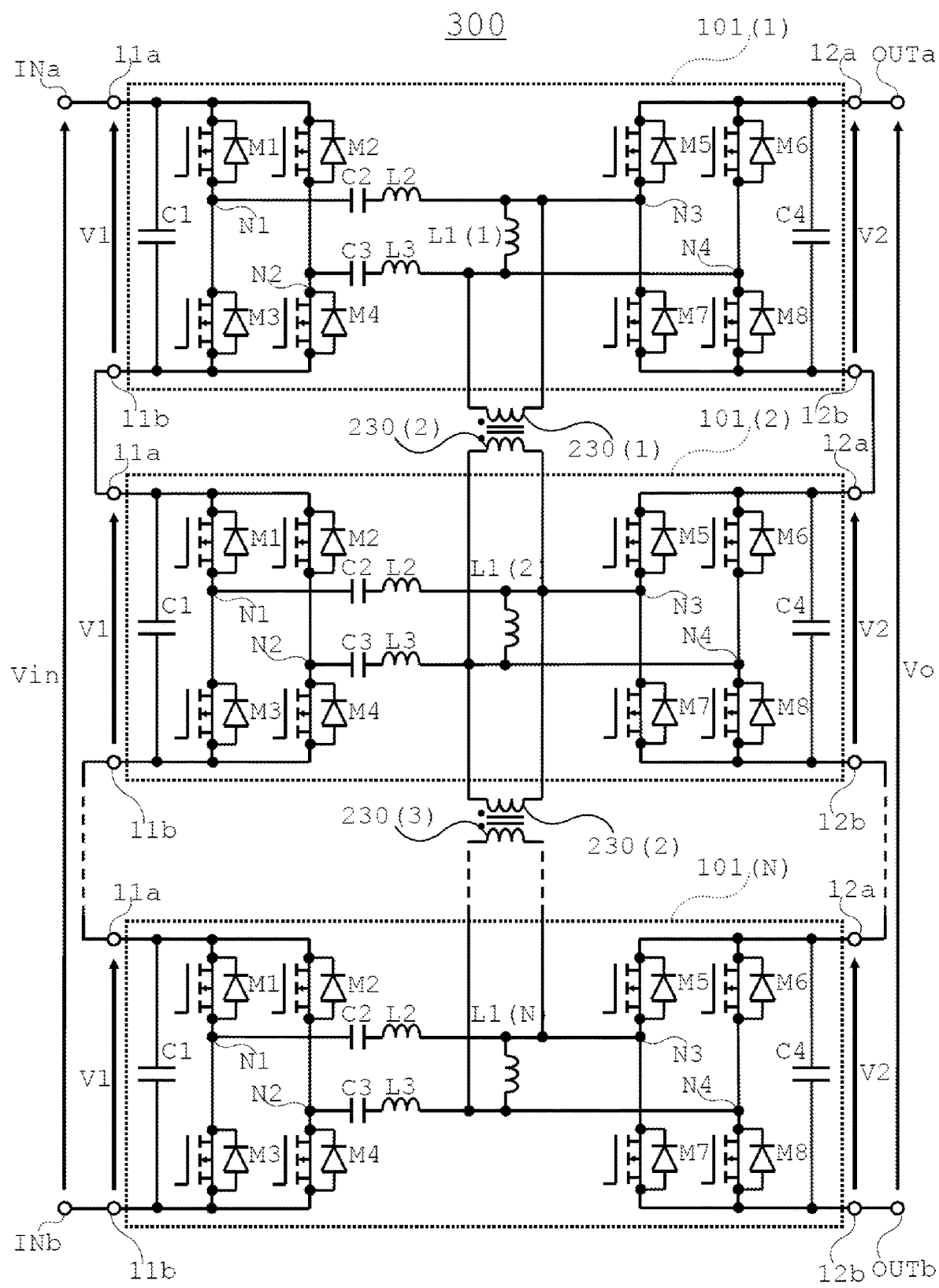
FIG. 3 is a diagram illustrating a configuration of a power conversion device according to a third embodiment.

FIG. 3 is a diagram illustrating a configuration of a power conversion device 300 according to a third embodiment. The power conversion device 300 does not include the fourth inductors 240(1) to 240(N) of the power conversion device 200 according to the second embodiment explained above. Instead, two third inductors 230 are connected in parallel to the first inductors L1(2) to L(N−1) of the DC-DC converter circuits 101(2) to 101(N−1).

The third inductor 230(1) connected in parallel to the first inductor L1(1) of the DC-DC converter circuit 101(1) and a certain third inductor 230(2) connected in parallel to the first inductor L1(2) of the DC-DC converter circuit 101(2) are magnetically coupled at equal coupling ratios, for example, 1:1. A transformer is configured by these two inductors.

Similarly, another third inductor 230(2) connected in parallel to the first inductor L1(2) of the DC-DC converter circuit 101(2) and a certain third inductor 230(3) connected in parallel to the first inductor L1(3) of the DC-DC converter circuit 101(3) are magnetically coupled at equal coupling ratios, for example, 1:1. A transformer is configured by these two inductors.

Similarly, the third inductor 230(N−1) connected in parallel to the first inductor L1(N−1) of the DC-DC converter circuit 101(N−1) and the third inductor 230(N) connected in parallel to the first inductor L1(N) of the DC-DC converter circuit 101(N) are magnetically coupled at equal coupling ratios, for example, 1:1. A transformer is configured by these two inductors.

Polarities of the transformers are set to equalize all of phases of AC voltages generated at both ends of the third inductors 230(1) to 230(N). Specifically, in the third embodiment, all of timings of switching control by the semiconductor switching elements M1 to M4 of the DC-DC converter circuits 101(1) to 101(N) are equal. Therefore, all of phases of AC voltages generated at both the ends of the third inductors 230(1) to 230(N) are equal. In this case, all of the polarities of the transformers are set to be the same polarity.

In the third embodiment, in the plurality of transforms configured by the third inductors 230(n−1) and 230(n), polarities based on the node N3 and the node N4 of the DC-DC converter circuit 101(n−1) and the node N3 and the node N4 of the DC-DC converter circuit 101(n) are the same.

In other words, a polarity of the transformer configured by the third inductors 230(n−1) and 230(n) is set in a direction in which, when an electric current flowing from the node N3 to the node N4 of certain one third inductor 230(1) increases, an electric current flowing from the nodes N4 to the nodes N3 of the third inductor 230(n) corresponding to the node N3 to the node N4 of the third inductor 230(1) increases.

Consequently, all of both end voltages of the third inductors 230(1) to 230(N) connected between the node N3 and the node N4 are balanced to be equal. All of both end voltages of the first inductors L1(1) to L1(N) connected in parallel to the third inductors 230(1) to 230(N) are also equal. As a result, the input voltages V1 to the DC-DC converter circuits 101(1) to 101(N) are equalized at high accuracy. The output voltages V2 from the DC-DC converter circuits 101(1) to 101(N) obtained by rectifying the both end voltages of the first inductors L1(1) to L1(N) are also equalized at high accuracy.

As explained above, in the power conversion device 300 according to the third embodiment, for each of the DC-DC converter circuits 101(1) to 101(N), the third inductor 230 connected in parallel to the first inductor L1 of the DC-DC converter circuit 101 and the third inductor L3 connected in parallel to the first inductor L1 of another DC-DC converter circuit 101 adjacent to the DC-DC converter circuit 101 are magnetically coupled. Here, "adjacent" means that the input terminal 11b of the DC-DC converter circuit 101 is connected to the input terminal 11a of another DC-DC converter circuit 101.

With the characteristics explained above, the power conversion device 300 according to the third embodiment can obtain the same effects as the effects in the second embodiment explained above. The number of transformers may be smaller than that in the second embodiment by one.

Note that, in the third embodiment, the third inductors 230 of the two DC-DC converter circuits 101 adjacent to each other are magnetically coupled. Consequently, voltages applied to the transformers are prevented from excessively increasing. However, the third inductors 230 of any two DC-DC converter circuits 101 may be magnetically coupled if the voltages are within a range of voltage resistance of the transformers.

Fourth Embodiment

Figure 4:
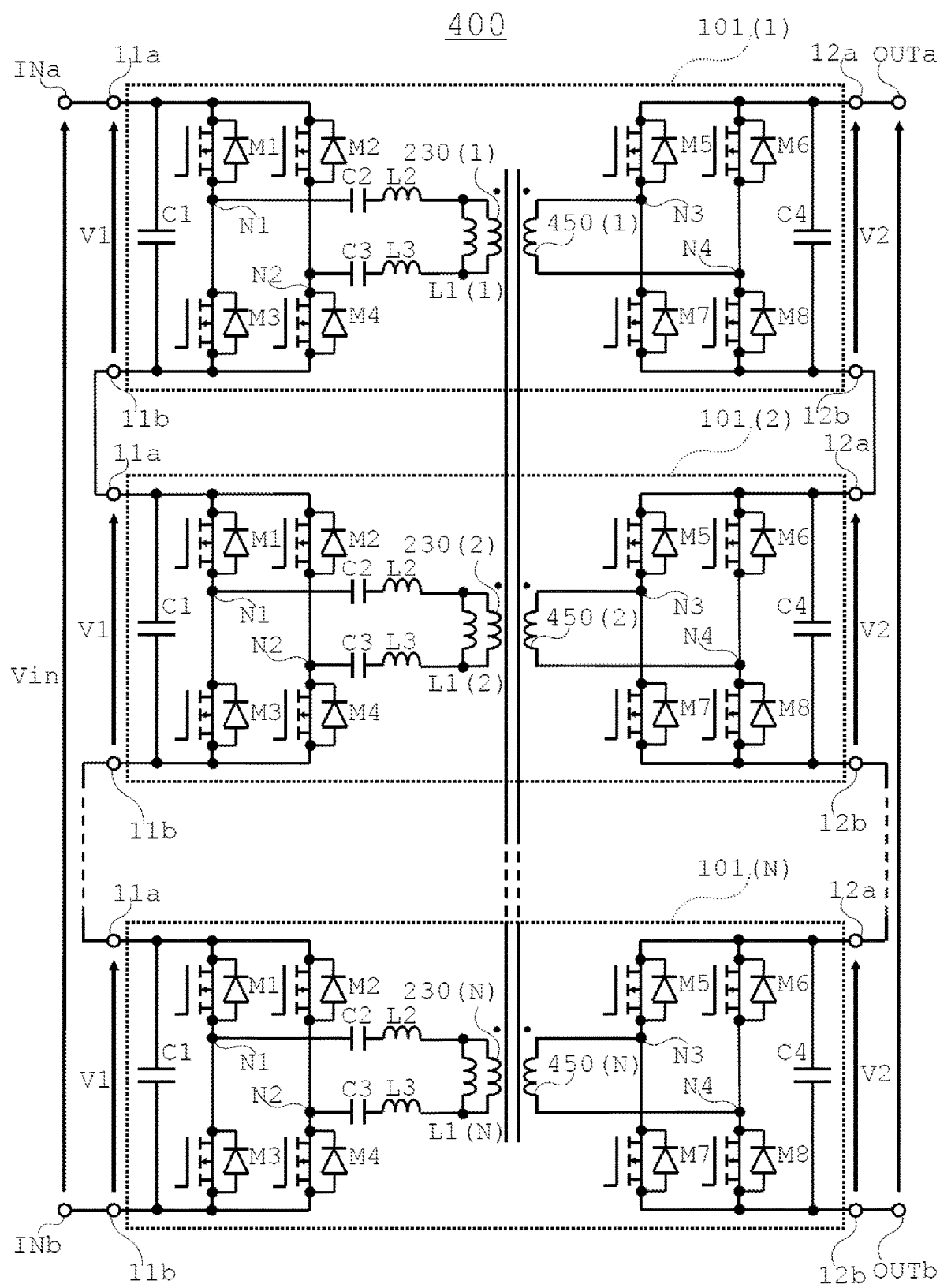
FIG. 4 is a diagram illustrating a configuration of a power conversion device according to a fourth embodiment.

FIG. 4 is a diagram illustrating a configuration of a power conversion device 400 according to the fourth embodiment. The power conversion device 400 includes fifth inductors 450(1) to 450(N) respectively connected to rectifier circuits on the output side of the DC-DC converter circuits 101(1) to 101(N) instead of the fourth inductors 240(1) to 240(N) of the power conversion device 200 according to the second embodiment explained above.

The third inductor 230(1) and the fifth inductor 450(1) of the DC-DC converter circuit 101(1) are magnetically coupled at equal coupling ratios, for example, 1:1. A transformer is configured by these two inductors. AC voltages generated at both the ends of the first inductor L1(1) of the DC-DC converter circuit 101(1) are transmitted to the rectifier circuit on the output side of the DC-DC converter circuit 101(1) via a transformer configured by the third inductor 230(1) and the fifth inductor 450(1).

Similarly, the third inductor 230(2) and the fifth inductor 450(2) of the DC-DC converter circuit 101(2) are magnetically coupled at equal coupling ratios, for example, 1:1. A transformer is configured by these two inductors. AC voltages generated at both ends of the first inductor L1(2) of the DC-DC converter circuit 101(2) are transmitted to a rectifier circuit on the output side of the DC-DC converter circuit 101(2) via a transformer configured by the third inductor 230(2) and the fifth inductor 450(2).

Similarly, the third inductor 230(N) and the fifth inductor 450(N) of the DC-DC converter circuit 101(N) are magnetically coupled at equal coupling ratios, for example, 1:1. A transformer is configured by these two inductors. AC voltages generated at both ends of the first inductor L1(N) of the DC-DC converter circuit 101(N) are transmitted to a rectifier circuit on the output side of the DC-DC converter circuit 101(N) via a transformer configured by the third inductor 230(N) and the fifth inductor 450(N).

Polarities of the transformers are set to equalize all of phases of AC voltages generated at both ends of the fifth inductors 450(1) to 450(N). Specifically, in the fourth embodiment, all of timings of switching control by the semiconductor switching elements M1 to M4 of the DC-DC converter circuits 101(1) to 101(N) are equal. Therefore, all of phases of AC voltages generated at both ends of the third inductors 230(1) to 230(N) are equal.

In this case, in order to equalize all of the phases of the AC voltages generated at both the ends of the fifth inductors 450(1) to 450(N), it is necessary to set all of the polarities of the transformers the same. In an example illustrated in FIG. 4, all of the polarities of the transformers are set to be the same polarity. Alternatively, all of the polarities of the transformers may be set to be reverse polarities.

In the fourth embodiment, in a plurality of transformers configured by the third inductors 230(1) to 230(N) and the fifth inductors 450(1) to 450(N), polarities based on the nodes N3 and N4 of the DC-DC converter circuits 101(1) to 101(N) are the same.

Consequently, all of both end voltages of the third inductors 230(1) to 230(N) are balanced to be equal. All of both end voltages of the first inductors L1(1) to L1(N) connected in parallel to the third inductors 230(1) to 230(N) are also equal. As a result, the input voltages V1 to the DC-DC converter circuits 101(1) to 101(N) are equalized at high accuracy. The output voltages V2 from the DC-DC converter circuits 101(1) to 101(N) obtained by rectifying the both end voltages of the first inductors L1(1) to L1(N) transmitted by the transformer are also equalized at high accuracy.

As explained above, in the power conversion device 400 according to the fourth embodiment, each of the DC-DC converter circuits 101(1) to 101(N) includes the fifth inductor 450 magnetically coupled to the third inductor 230 connected in parallel to the first inductor L1, the fifth inductor 450 being connected to the rectifier circuit on the output side. A transformer that transmits AC voltages generated at both ends of the first inductor L1 is configured by the third inductor 230 and the fifth inductor 450. A core is common to the transformers of the DC-DC converter circuits 101(1) to 101(N).

With the characteristics explained above, the power conversion device 400 according to the fourth embodiment can obtain the same effects as the effects in the second embodiment explained above.

Fifth Embodiment

Figure 5:
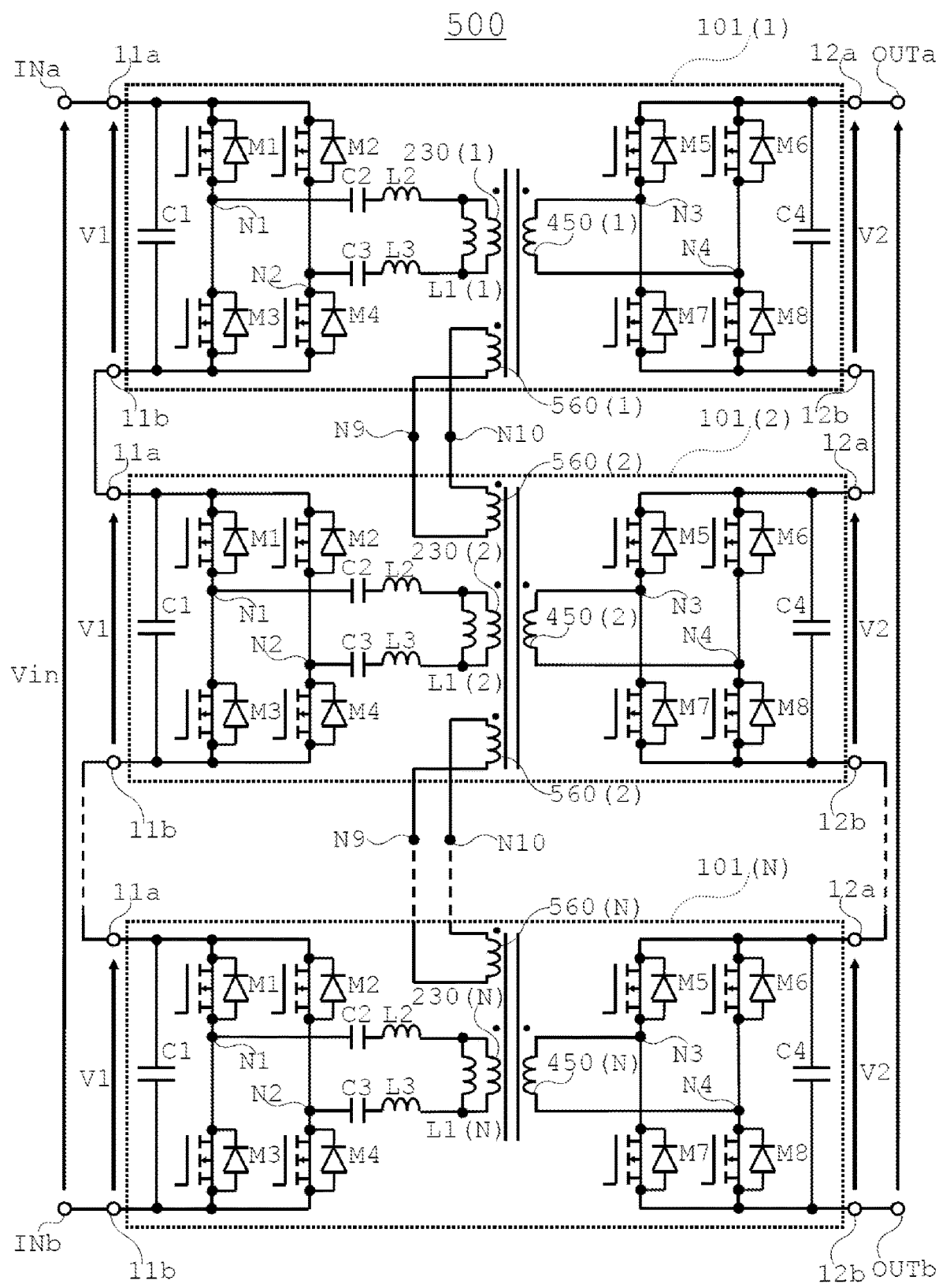
FIG. 5 is a diagram illustrating a configuration of a power conversion device according to a fifth embodiment.

FIG. 5 is a diagram illustrating a configuration of a power conversion device 500 according to a fifth embodiment. The power conversion device 500 includes sixth inductors 560(1) to 560(N) magnetically connected to the third inductors 230(1) to 230(N) instead of including a core common to transformers like the power conversion device 400 according to the fourth embodiment explained above.

Specifically, the DC-DC converter circuit 101(1) includes one sixth inductor 560 magnetically connected to the third inductor 230(1). Each of the DC-DC converter circuits 101(2) to 101(N-1) includes two sixth inductors 560 magnetically connected to each of the third inductors 230(2) to 230(N-1). The DC-DC converter circuit 101 (N) includes one sixth inductor 560 magnetically connected to the third inductor 230(N).

Both ends of the sixth inductor 560(1) included in the DC-DC converter circuit 101(1) are connected in parallel to both ends of a certain sixth inductor 560(2) included in the DC-DC converter circuit 101(2). Specifically, the sixth inductor 560(1) of the DC-DC converter circuit 101(1) and the certain sixth inductor 560(2) of the DC-DC converter circuit 101(2) are connected in parallel between a ninth node N9 and a tenth node N10.

Similarly, both ends of another sixth inductor 560(2) included in the DC-DC converter circuit 101(2) are connected in parallel to both ends of a certain sixth inductor 560(3) included in the DC-DC converter circuit 101(3). Specifically, the other sixth inductor 560(2) of the DC-DC converter circuit 101(2) and the certain sixth inductor 560(3) of the DC-DC converter circuit 101(3) are connected in parallel between the ninth node N9 and the tenth node N10.

Similarly, both ends of the sixth inductor 560(N-1) included in the DC-DC converter circuit 101(N-1) are connected in parallel to both ends of the sixth inductor 560(N) included in the DC-DC converter circuit 101(N). Specifically, the sixth inductor 560(N-1) of the DC-DC converter circuit 101(N-1) and the sixth inductor 560(N) of the DC-DC converter circuit 101(N) are connected in parallel between the ninth node N9 and the tenth node N10.

In the third embodiment, in a plurality of transformers configured by the third inductors 230(1) to 230(N) and the sixth inductors 560(1) to 560(N), polarities based on the nodes N1, N2, N9, and N10 are the same.

In other words, polarities of the plurality of transformers configured by the third inductors 230(1) to 230(N) and the sixth inductors 560(1) to 560(N) are set such that, when an electric current flowing from an end portion on one node N1 side to an end portion on the other node N2 side of certain one third inductor 230 increases, an electric current flowing from end portions on the other node N2 side to end portions on one node N1 side of the other plurality of third inductors 230 increases.

Consequently, all of both end voltages of the third inductors 230(1) to 230(N) are balanced to be equal. All of both end voltages of the first inductors L1(1) to L1(N) connected in parallel to the third inductors 230(1) to 230(N) are also equal. As a result, the input voltages V1 to the DC-DC converter circuits 101(1) to 101(N) are equalized at high accuracy. The output voltages V2 from the DC-DC converter circuits 101(1) to 101(N) obtained by rectifying the both end voltages of the first inductors L1(1) to L1(N) transmitted by the transformer are also equalized at high accuracy.

As explained above, in the power conversion device 500 according to the fifth embodiment, each of the DC-DC converter circuits 101(1) to 101(N) includes the one or two sixth inductors magnetically connected to the third inductor 230 connected in parallel to the first inductor L1. Both ends of the sixth inductor 560 included in certain one DC-DC converter circuit are connected in parallel to both ends of the sixth inductors 560 included in another DC-DC converter circuit 101.

With the characteristics explained above, the power conversion device 500 according to the fifth embodiment can obtain the same effects as the effects in the fourth embodiment.

Modifications

In the first to fifth embodiments explained above, the DC-DC converter circuits 101(1) to 101(N) are the LLC-type converter circuits. However, a DC-DC converter circuit to which the technique according to the present embodiments are applicable is not limited to the LLC-type converter circuit. The technique according to the present embodiments can be applied to any DC-DC converter circuit that switches a DC voltage to generate an AC voltage and rectifies the AC voltage to output a DC voltage.

In the first to fifth embodiments explained above, a plurality of inductors and a plurality of transformers being connected in parallel means that end portions of the plurality of inductors and the plurality of transformers are connected between specific two nodes to align winding directions and polarities.

In the first to fifth embodiments explained above, the N-channel type MOSFETs are used as the semiconductor switching elements M1 to M8. Instead of the N-channel MOSFETs, P-channel type MOSFETs may be used as the semiconductor switching elements M1 to M8.

The semiconductor switching element is not limited to the MOSFET. For example, an IGBT (Insulated Gate Bipolar Transistor), a BJT (Bipolar Junction Transistor), or the like may be used as the semiconductor switching element. As a semiconductor configuring the semiconductor switching element or a semiconductor diode, various materials such as Si (Silicon), SiC (Silicon Carbide), and GaN (Gallium Nitride) can be used.

While certain embodiment have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

Clauses

Clause 1. (first embodiment) A power conversion device comprising:
a plurality of DC-DC converter circuits configured to generate AC voltages at both ends of a plurality of first inductors by switching on a DC voltage and rectifies the AC voltages to output DC voltages; and
a plurality of second inductors respectively magnetically coupled to the plurality of first inductors of the plurality of DC-DC converter circuits, wherein
inputs and outputs of the plurality of DC-DC converter circuits are respectively connected in series and the plurality of second inductors are connected in parallel between two nodes.

Clause 2. (first embodiment) The power conversion device according to Clause 1, wherein
a plurality of transformers are configured by the plurality of first inductors and the plurality of second inductors respectively magnetically coupled to the plurality of first inductors, and
polarities of the plurality of transformers are set in a direction in which, when an electric current flowing from one end to another end of one of the first inductors increases, an electric current flowing from another end to one end of another one of the first inductors increases.

Clause 3. (first to fifth embodiments) A power conversion device comprising:
a plurality of DC-DC converter circuits configured to generate AC voltages at both ends of a plurality of first inductors by switching on a DC voltage and rectifies the AC voltages to output DC voltages; and
a plurality of third inductors respectively connected in parallel to the plurality of first inductors of the plurality of DC-DC converter circuits, wherein
inputs and outputs of the plurality of DC-DC converter circuits are respectively connected in series and the plurality of third inductors are magnetically connected in parallel.

Clause 4. (second embodiment) The power conversion device according to Clause 3, further comprising a plurality of fourth inductors (240) respectively magnetically coupled to the plurality of third inductors (230), wherein
the plurality of fourth inductors are connected in parallel between two nodes.

Clause 5. (second embodiment) The power conversion device according to Clause 4, wherein
a plurality of transformers are configured by the plurality of third inductors and the plurality of fourth inductors respectively magnetically coupled to the plurality of third inductors, and
polarities of the plurality of transformers are set in a direction in which, when an electric current flowing from one end to another end of certain one of the third inductors increases, an electric current flowing from other ends to one ends of the other third inductors increases.

Clause 6. (third embodiment) The power conversion device according to Clause 3, wherein, for each of the plurality of DC-DC converter circuits, the third inductor connected in parallel to the first inductor of the DC-DC converter circuit and the third inductor connected in parallel to the first inductor of any another DC-DC converter circuit are magnetically coupled.

Clause 7. (third embodiment) The power conversion device according to Clause 6, wherein, for each of the plurality of DC-DC converter circuits, the third inductor connected in parallel to the first inductor of the DC-DC converter circuit and the third inductor connected in parallel to the first inductor of another DC-DC converter circuit adjacent to the DC-DC converter circuit are magnetically coupled.

Clause 8. (third embodiment) The power conversion device according to Clause 7, wherein
a plurality of transformers are configured by the plurality of third inductors and the plurality of fourth inductors respectively magnetically coupled to the plurality of third inductors, and
polarities of the plurality of transformers are set in a direction in which, when an electric current flowing from one end to another end of certain one of the third inductors increases, an electric current flowing from other ends to one ends of the other third inductors increases.

Clause 9. (fourth embodiment) The power conversion device according to Clause 3, wherein
each of the plurality of DC-DC converter circuits further includes a fifth inductor (450) magnetically coupled to the third inductor connected in parallel to the first inductor, the fifth inductor being connected to an output side of the DC-DC converter circuit, and
a transformer that transmits the AC voltages generated at both the ends of the first inductor is configured by the third inductor and the fifth inductor, and
a core is common to the transformers of the plurality of DC-DC converter circuits.

Clause 10. (fifth embodiment) The power conversion device according to Clause 3, wherein
each of the plurality of DC-DC converter circuits further includes a fifth inductor magnetically coupled to the third inductor connected in parallel to the first inductor, the fifth inductor being connected to an output side of the DC-DC converter circuit, and a sixth inductor (560) magnetically connected to the third inductor, and a transformer that transmits the AC voltages generated at both the ends of the first inductor is configured by the third inductor and the fifth inductor, and
both ends of the fifth inductor included in one of the DC-DC converter circuits are connected in parallel to both ends of the sixth inductor included in another one of the DC-DC converter circuits.

The invention claimed is:

1. A power conversion device comprising:
a plurality of DC-DC converter circuits configured to generate AC voltages at both ends of a plurality of first inductors by switching a DC voltage and rectifies the AC voltages to output DC voltages; and
a plurality of second inductors respectively magnetically coupled with the plurality of first inductors of the plurality of DC-DC converter circuits,
wherein
inputs and outputs of the plurality of DC-DC converter circuits are respectively connected in series and the plurality of second inductors are connected in parallel between two nodes, and
the plurality of first inductors are connected in parallel with each other though the plurality of second inductors.

2. The power conversion device according to claim 1, wherein
a plurality of transformers are configured by the plurality of first inductors and the plurality of second inductors respectively magnetically coupled with the plurality of first inductors, and
polarities of the plurality of transformers are configured such that, an increase in electric current in one direction of any one of the first inductors induces electric currents in opposite direction of the other first inductors.

3. A power conversion device comprising:
a plurality of DC-DC converter circuits configured to generate AC voltages at both ends of a plurality of first inductors by switching a DC voltage and rectifies the AC voltages to output DC voltages; and
a plurality of third inductors respectively connected in parallel with the plurality of first inductors of the plurality of DC-DC converter circuits,
wherein
inputs and outputs of the plurality of DC-DC converter circuits are respectively connected in series and the plurality of third inductors are magnetically connected in parallel, and
the plurality of first inductors are connected in parallel with each other though the plurality of third inductors.

4. The power conversion device according to claim 3, further comprising a plurality of fourth inductors respectively magnetically coupled with the plurality of third inductors,
wherein the plurality of fourth inductors are connected in parallel between two nodes.

5. The power conversion device according to claim 4, wherein
a plurality of transformers are configured by the plurality of third inductors and the plurality of fourth inductors respectively magnetically coupled with the plurality of third inductors, and
polarities of the plurality of transformers are configured such that, an increase in electric current in one direction of any one of the third inductors induces electric currents in opposite direction of the other third inductors.

6. The power conversion device according to claim 3, wherein
each of the plurality of DC-DC converter circuits further includes a fifth inductor magnetically coupled with the third inductor connected in parallel with the first inductor, the fifth inductor being connected with an output side of the DC-DC converter circuit, and a sixth inductor magnetically connected with the third inductor, and a transformer that transmits the AC voltages generated at both the ends of the first inductor is configured by the third inductor and the fifth inductor, and
both ends of the fifth inductor included in any one of the DC-DC converter circuits are connected in parallel with both ends of the sixth inductor included in any another one of the DC-DC converter circuits.

7. A power conversion device comprising:
a plurality of DC-DC converter circuits configured to generate AC voltages at both ends of a plurality of first inductors by switching a DC voltage and rectifies the AC voltages to output DC voltages; and
a plurality of third inductors respectively connected in parallel with the plurality of first inductors of the plurality of DC-DC converter circuits,
wherein
inputs and outputs of the plurality of DC-DC converter circuits are respectively connected in series and the plurality of third inductors are magnetically connected in parallel, and
the third inductor connected in parallel with the first inductor of any one of the DC-DC converter circuits and the third inductor connected in parallel with the first inductor of any another one of the DC-DC converter circuits are magnetically coupled.

8. The power conversion device according to claim 7, wherein the third inductor connected in parallel with the first inductor of with any one of the DC-DC converter circuits and the third inductor connected in parallel with the first inductor of the other DC-DC converter circuit adjacent to said DC-DC converter circuit are magnetically coupled.

9. The power conversion device according to claim 8, wherein
a plurality of transformers are configured by the plurality of third inductors, and
polarities of the plurality of transformers are configured such that, an increase in electric current in one direction of any one of the third inductors induces electric current in opposite direction of the other third inductor magnetically coupled with said third inductor.

10. A power conversion device comprising:
a plurality of DC-DC converter circuits configured to generate AC voltages at both ends of a plurality of first inductors by switching a DC voltage and rectifies the AC voltages to output DC voltages; and a plurality of third inductors respectively connected in parallel with the plurality of first inductors of the plurality of DC-DC converter circuits, wherein
- inputs and outputs of the plurality of DC-DC converter circuits are respectively connected in series and the plurality of third inductors are magnetically connected in parallel, and
- each of the plurality of DC-DC converter circuits further includes a fifth inductor magnetically coupled with the third inductor connected in parallel with the first inductor, the fifth inductor being connected with an output side of the DC-DC converter circuit, and a transformer that transmits the AC voltages generated at both the ends of the first inductor is configured by the third inductor and the fifth inductor, and
- a core is common to the transformers of the plurality of DC-DC converter circuits.

* * * * *